(12) United States Patent
Jeon et al.

(10) Patent No.: US 8,933,597 B2
(45) Date of Patent: Jan. 13, 2015

(54) LINEAR VIBRATION MOTOR

(75) Inventors: Young Jae Jeon, Gyunggi-do (KR); Seung Hyeon Jeong, Gyunggi-do (KR)

(73) Assignee: Samsung Electro-Mechanics Co., Ltd, Gyunggi-Do (KR)

( * ) Notice: Subject to any disclaimer, the term of this patent is extended or adjusted under 35 U.S.C. 154(b) by 467 days.

(21) Appl. No.: 13/228,302

(22) Filed: Sep. 8, 2011

(65) Prior Publication Data
US 2013/0002054 A1   Jan. 3, 2013

(30) Foreign Application Priority Data
Jun. 30, 2011   (KR) .......................... 10-2011-0064702

(51) Int. Cl.
*H02K 33/00* (2006.01)
*H02K 33/16* (2006.01)
*H02K 5/04* (2006.01)
*H02K 5/22* (2006.01)

(52) U.S. Cl.
CPC ................. *H02K 33/16* (2013.01); *H02K 5/04* (2013.01); *H02K 5/225* (2013.01); *H02K 2203/03* (2013.01); *H02K 2211/03* (2013.01)
USPC ............................................. 310/25; 310/71

(58) Field of Classification Search
None
See application file for complete search history.

(56) References Cited

U.S. PATENT DOCUMENTS

| | | | |
|---|---|---|---|
| 4,054,767 A * | 10/1977 | Anderson et al. ............. | 200/293 |
| 5,037,208 A * | 8/1991 | Dussault et al. .............. | 366/127 |
| 6,774,518 B2 * | 8/2004 | Howe et al. ................... | 310/89 |
| 6,954,016 B2 * | 10/2005 | Ueda et al. .................... | 310/81 |
| 7,056,104 B2 * | 6/2006 | Kimura et al. ............. | 417/410.1 |
| 7,576,461 B2 * | 8/2009 | Wong et al. ................... | 310/89 |
| 7,670,639 B2 * | 3/2010 | Gallant et al. ................ | 427/117 |
| 2002/0190588 A1 * | 12/2002 | Koenigs et al. ................ | 310/71 |
| 2005/0184601 A1 * | 8/2005 | Kweon et al. .................. | 310/36 |
| 2007/0207672 A1 * | 9/2007 | Takagi et al. ................ | 439/607 |

(Continued)

FOREIGN PATENT DOCUMENTS

| CN | 1866681 A | 11/2006 |
|---|---|---|
| CN | 201274442 Y | 7/2009 |

(Continued)

OTHER PUBLICATIONS

Office Action dated Dec. 18, 2012 for related Korean Patent Application No. 10-2011-0064702 and its English summary.

(Continued)

*Primary Examiner* — Tran Nguyen
(74) *Attorney, Agent, or Firm* — Ladas & Parry, LLP

(57) ABSTRACT

Disclose herein is a linear vibration motor including: a stator part including a coil having a power applied from the outside thereto to form a magnetic field; a vibrator part including a magnet facing the coil; and an elastic member having one end coupled to the stator part and the other end coupled to the vibrator part to elastically support linear vibration of the vibrator part, wherein the stator part includes: a cover member including a set fixing part extended to one side thereof to thereby be fixedly coupled to a set component and an extended plate extended to the other side thereof; an upper case coupled to an upper portion of the cover member so as to receive the vibrator part therein; a printed circuit board having the coil coupled thereto and coupled to the cover member and an upper portion of the extended plate; and a contact part fixedly coupled to an upper portion of the printed circuit board of which a portion is coupled to the extended plate.

15 Claims, 6 Drawing Sheets

(56) References Cited

U.S. PATENT DOCUMENTS

| | | | |
|---|---|---|---|
| 2008/0306332 A1* | 12/2008 | Choi et al. | 600/38 |
| 2010/0033045 A1* | 2/2010 | Dong | 310/81 |
| 2010/0225182 A1* | 9/2010 | Wada et al. | 310/43 |
| 2010/0277010 A1* | 11/2010 | Jeon | 310/25 |

FOREIGN PATENT DOCUMENTS

| | | |
|---|---|---|
| JP | 2001-339926 | 12/2001 |
| JP | 2002-369486 | 12/2002 |
| KR | 10-2001-0047765 | 6/2001 |
| KR | 10-0307737 | 6/2001 |
| KR | 10-2011-0010408 | 2/2011 |

OTHER PUBLICATIONS

Office action dated Jun. 28, 2013 from corresponding Korean Patent Application No. 10-2011-0064702 and its English summary provided by the client.

Office Action dated Mar. 5, 2014 for corresponding Chinese Patent Application No. 201110260607.X and its English summary provided by the Applicant's foreign counsel.

* cited by examiner

LINEAR VIBRATION MOTOR

CROSS REFERENCE TO RELATED APPLICATION

This application claims the benefit of Korean Patent Application No. 10-2011-0064702, filed on Jun. 30, 2011, entitled "Linear Vibration Motor" which is hereby incorporated by reference in its entirety into this application.

BACKGROUND OF THE INVENTION

1. Technical Field

The present invention relates to a linear vibration motor.

2. Description of the Related Art

Various types of vibration generating devices have been mounted in portable electronic devices such as a cellular phone, a game machine, a personal digital assistant, and the like. Particularly, a failure of the portable electronic device may be generated due to an unexpected short-circuit in a state in which the vibration generating device is mounted in the portable electronic device.

In addition, it is necessary to facilitate matching between the vibration generating device and set components at the time of mounting of the vibration generating device in the portable electronic device to thereby improve property, productivity, and the like.

FIG. 1 is a perspective view of the vibration generating device according to the prior art. As shown, in a vibration generating device 1, connection units 14 electrically connected to each other are formed on a disk type substrate member 12 positioned on a bottom surface of an upper case 11 to apply a power, thereby making it possible to allow surface mounting to be performed.

However, in the case of the vibration generating device having the above-mentioned structure, which is a structure for simply applying a power, since the connection unit 14, which is a power applying part, is exposed to the outside, when the connection unit 14 contacts the other surrounding set components, a short-circuit is generated to thereby cause a failure of the portable electronic device.

In addition, since there is no a method for fixing the vibration generating device to the set components, which is important in mounting, the vibration generating device may be separated from the set components during treatment or operation.

Further, the connection unit 14 is positioned on the bottom surface, such that deformation due to pressing at the time of contact may be generated and a mounting state may not be confirmed with the naked eye.

SUMMARY OF THE INVENTION

The present invention has been made in an effort to provide a linear vibration motor capable of improving coupling force between the linear vibration motor and various set components and preventing a short-circuit by including a set fixing part coupled to an external set component.

Further, the present invention has been made in an effort to provide a linear vibration motor capable of confirming a coupled state at the time of coupling between the linear vibration motor and a flexible printed circuit board (FPCB), which is one of external set components, with the naked eye by including a contact part electrically connected to the FPCB.

According to a first preferred embodiment of the present invention, there is provided a linear vibration motor including: a stator part including a coil having a power applied from the outside thereto to form a magnetic field; a vibrator part including a magnet facing the coil; and an elastic member having one end coupled to the stator part and the other end coupled to the vibrator part to elastically support linear vibration of the vibrator part, wherein the stator part includes: a cover member including a set fixing part extended to one side thereof to thereby be fixedly coupled to a set component and an extended plate extended to the other side thereof; an upper case coupled to an upper portion of the cover member so as to receive the vibrator part therein; a printed circuit board having the coil coupled thereto and coupled to the cover member and an upper portion of the extended plate; and a contact part fixedly coupled to an upper portion of the printed circuit board of which a portion is coupled to the extended plate.

The set fixing part may include: a set fixing strip extended from one side of the cover member to thereby surface-contact the set component and including a set fixing hole formed therein, the set fixing hole including a thread formed in an inner peripheral surface thereof; and a fixing member made of a metal material and fixedly coupling the set fixing strip and the set component to each other while penetrating through the set fixing hole.

The set fixing part may be formed singly or in plural along an outer peripheral surface of the cover member so as not to be overlapped with the extended plate extended from the other side of the cover member.

The contact part may have a spring shape, and the set component electrically connected to the contact part may be a flexible printed circuit board (FPCB).

The contact part may be made of an electrically conductive material so as to be electrically connected to the FPCB, which is the set component.

The stator part may further include a damper coupled to an upper surface of the cover member and faces the vibrator part.

The vibrator part may further include: a yoke including a coupling part having the magnet coupled to an inner portion thereof; and a mass body coupled to an outer side of the yoke, and the elastic member may include an upper end portion connected to the upper case and a lower end portion connected to an upper portion of the yoke to thereby elastically support the linear vibration of the vibrator part.

The vibrator part may further include: a plate yoke coupled to a lower surface of the magnet; a magnetic fluid coupled to an outer peripheral surface of the magnet; and a damper coupled to a surface of the elastic member facing the upper case.

The upper case may further include a second set fixing part extended to one side thereof to thereby be fixedly coupled to the set component.

The second set fixing part may include: a second set fixing strip extended from one side of the upper case to thereby surface-contact the set component and including a set fixing hole formed therein, the set fixing hole including a thread formed in an inner peripheral surface thereof; and a fixing member made of a metal material and fixedly coupling the second set fixing strip and the set component to each other while penetrating through a second set fixing hole.

The second set fixing part may be formed singly or in plural along an outer peripheral surface of the upper case so as not to be overlapped with the extended plate extended from the other side of the cover member.

One of the second set fixing part formed in plural may be extended from the outer peripheral surface of the upper case so as to face the set fixing part extended from the cover member in one side thereof.

According to a second preferred embodiment of the present invention, there is provided a linear vibration motor including: a stator part including a coil having a power applied from the outside thereto to form a magnetic field; a vibrator part including a magnet facing the coil; and an elastic member having one end coupled to the stator part and the other end coupled to the vibrator part to elastically support linear vibration of the vibrator part, wherein the stator part includes: a cover member including an extended plate extended to one side thereof; an upper case including a set fixing part extended to one side thereof to thereby be fixedly coupled to a set component and coupled to an upper portion of the cover member so as to receive the vibrator part therein; a printed circuit board having the coil coupled thereto and coupled to the cover member and an upper portion of the extended plate; and a contact part fixedly coupled to an upper portion of the printed circuit board of which a portion is coupled to the extended plate.

The set fixing part may include: a set fixing strip extended from one side of the upper case to thereby surface-contact the set component and including a set fixing hole formed therein, the set fixing hole including a thread formed in an inner peripheral surface thereof; and a fixing member made of a metal material and fixedly coupling the set fixing strip and the set component to each other while penetrating through the set fixing hole.

The set fixing part may be formed singly or in plural along an outer peripheral surface of the upper case so as not to be overlapped with the extended plate extended from one side of the cover member.

The contact part may have a spring shape, and the set component electrically connected to the contact part may be a FPCB.

The contact part may be made of an electrically conductive material so as to be electrically connected to the FPCB, which is the set component.

DESCRIPTION OF THE PREFERRED EMBODIMENTS

Figure 1:
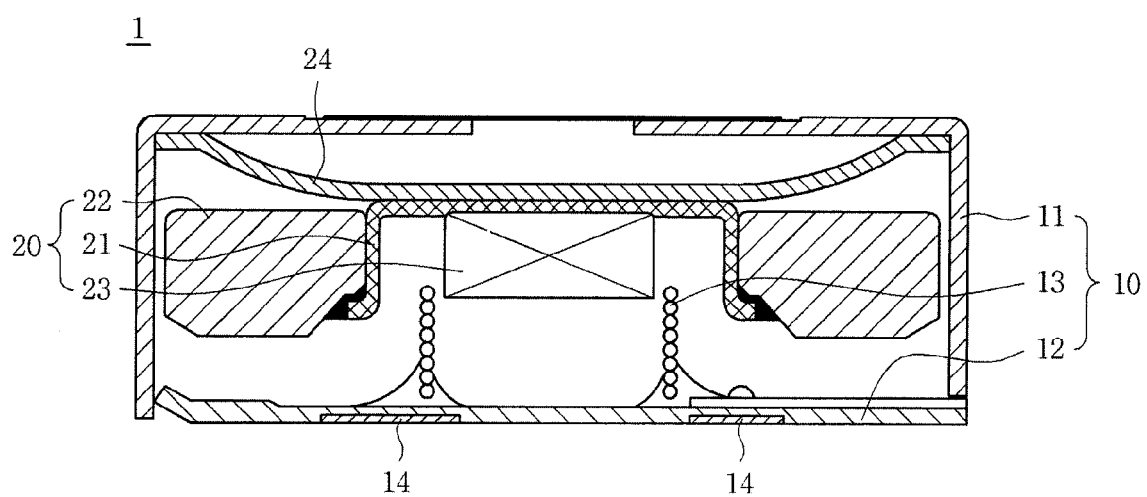
FIG. 1 is a cross-sectional view showing a coupled state of the vibration generating device according to the prior art.

Various objects, advantages and features of the invention will become apparent from the following description of embodiments with reference to the accompanying drawings. In the specification, in adding reference numerals to components throughout the drawings, it is to be noted that like reference numerals designate like components even though components are shown in different drawings. Further, terms used in the specification, 'first', 'second', etc. can be used to describe various components, but the components are not to be construed as being limited to the terms. The terms are only used to differentiate one component from other components. Further, when it is determined that the detailed description of the known art related to the present invention may obscure the gist of the present invention, the detailed description thereof will be omitted.

Hereinafter, preferred embodiments of the present invention will be described in detail with reference to the accompanying drawings.

Figure 2:
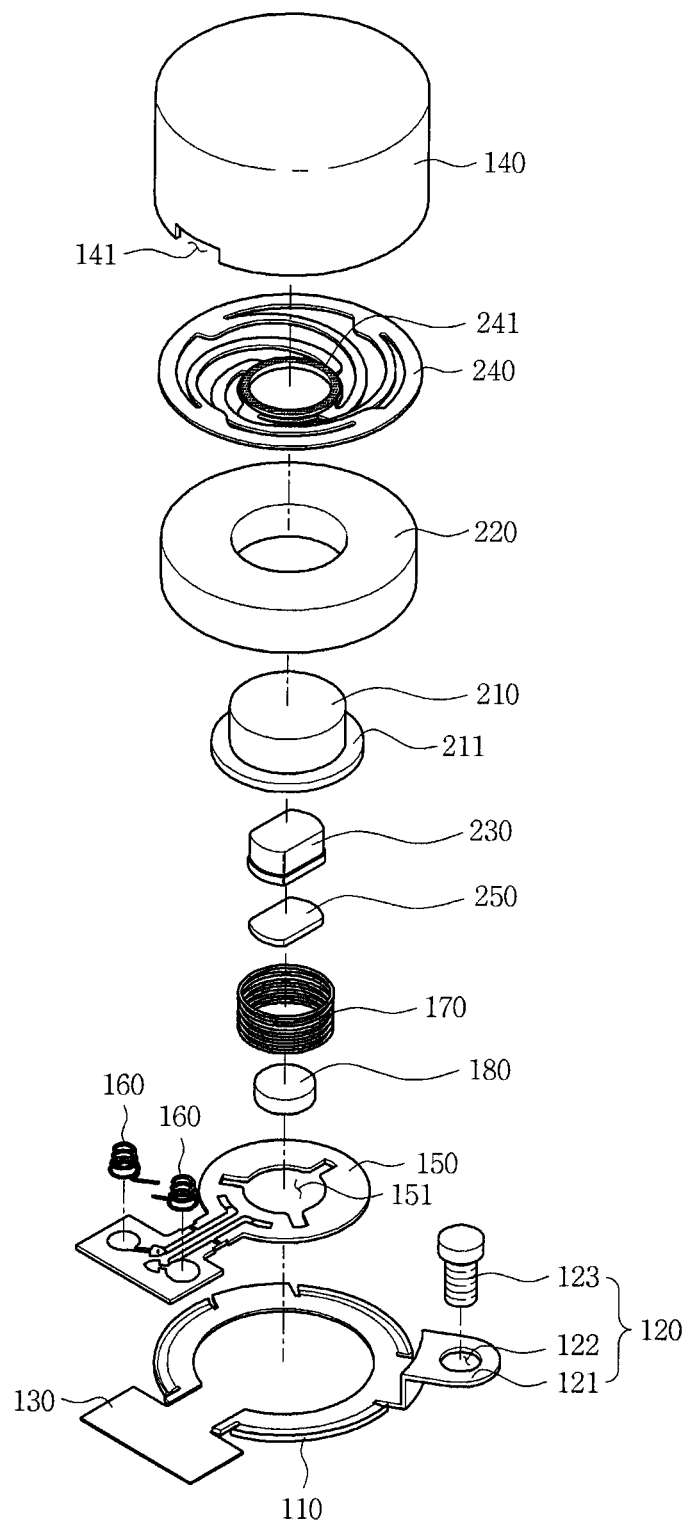
FIG. 2 is an exploded perspective view of a linear vibration motor according to a preferred embodiment of the present invention.
Figure 3:
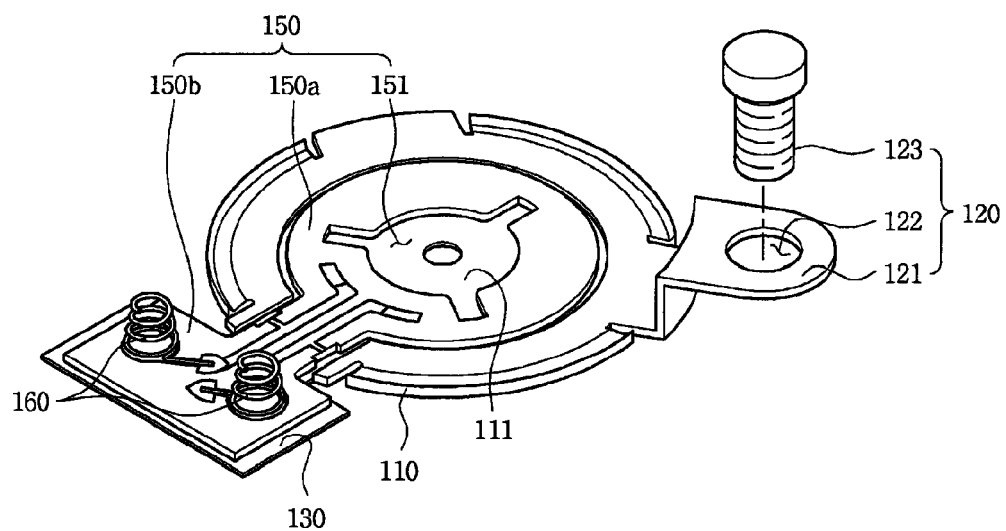
FIG. 3 is a schematic perspective view of a stator part shown in FIG. 2.

FIG. 2 is an exploded perspective view of a linear vibration motor according to a preferred embodiment of the present invention; and FIG. 3 is a schematic perspective view of a stator part shown in FIG. 2. As shown, a linear vibration motor according to the preferred embodiment of the present invention includes a stator part and a vibrator part linearly vibrating with respect to the stator part.

More specifically, the stator part includes a cover member 110, an upper case 140, a printed circuit board 150, a contact part 160, a coil 170, and a damper 180.

In addition, as shown, the cover member 110 includes a set fixing part 120 and an extended plate 130.

More specifically, the set fixing part 120 includes a set fixing strip 121 extended from one side of the cover member 110, a set fixing hole 122 formed in the set fixing strip 121, and a fixing member 123 penetrating through the set fixing hole 122.

In addition, according to the preferred embodiment of the present invention, the fixing member 123 may be made of a metal material in order to serve as a ground.

Further, according to the preferred embodiment of the present invention, the fixing member 123 may be a bolt. However, the fixing member 123 is not limited thereto.

In addition, the extended plate 130 is extended from the other side of the cover member 110 so as not to be overlapped with the set fixing part 120.

Therefore, a thread may be formed on an inner peripheral surface of the set fixing hole 122 so that the fixing member 123 having a bolt shape is fixedly coupled to a set component while penetrating through the set fixing hole 122.

In addition, the upper case 140 is coupled to an upper portion of the cover member 110 so as to receive the vibrator part therein.

Further, the upper case 140 includes a step part 141 formed at a position corresponding to that of the extended plate 130 of the cover member 110 so that the extended plate 130 may be protruded to the outside.

In addition, the printed circuit board 150 may be divided into a region 150a coupled to a portion of the cover member 110 and a region 150b fixedly coupled to an upper portion of the extended plate 130.

Further, the contact part 160 is fixedly coupled to an upper portion of the region 150b of the printed circuit board of which a portion is coupled to the upper portion of the extended plate 130.

In addition, the contact part 160 may be made of an electrically conductive material so as to be electrically connected to a flexible printed circuit board (1 PCB), which is one of set components to be described below, and have a spring shape so as to have elastic force according to the preferred embodiment of the present invention.

Further, the coil 170 is fixedly coupled to an upper portion of the region 150a of the printed circuit board coupled to an upper portion of the cover member 110, and may have a cylindrical shape so as to receive a magnet 230 configuring a linearly vibrated vibrator part to be described below therein.

In addition, the damper 180 is installed on the upper portion 111 of the cover member 110 while penetrating through a hole 151 formed at the center of the printed circuit board 150 so as to face the magnet 230.

More specifically, the damper 180 may prevent abrasion and vibration noise caused by contact between the magnet 230 and the cover member 110 due to excessive linear vibration of the vibrator part.

According to the preferred embodiment of the present invention, the vibrator part includes a magnet 230, a yoke 210, a mass body 220, an elastic member 240, a plate yoke 250, a magnetic fluid (not shown), and the damper 180.

As shown, the yoke 210 includes a protrusion part 211 having the mass body 220 seated thereon and a coupling part (not shown) having the magnet 230 received therein.

More specifically, the mass body 220 is seated on the protrusion part 211 protruded from the other end of the yoke 210, such that the mass body 220 is coupled to an outer side of the yoke 210.

In addition, the magnet 230 generating electromagnetic force by electromagnetic induction with the coil 170 is coupled to the coupling part.

Further, the mass body 220 is coupled to the outer side of the yoke 210 to thereby add a predetermined mass to the vibrator part for linear vibration of the linear vibration motor.

In addition, the magnet 230 is coupled to a lower portion of the coupling part of the yoke 210 so as to face the coil 170 installed on the upper portion of the cover member 110.

Therefore, the magnet 230 linearly vibrates so that it may be inserted into an internal space formed by the coil 170.

Further, the magnet 230 includes the magnetic fluid formed on an outer peripheral surface thereof and the plate yoke 250 coupled to a lower surface thereof.

More specifically, the plate yoke 250 allows magnetic force of the magnet 230 to be constantly inducted and smoothly generated.

In addition, the elastic member 240 may have a leaf spring shape extended in a spiral direction in order to have elastic force, as shown in FIG. 2.

More specifically, the elastic member 240 has one end coupled to the upper case 140 and the other end coupled to an upper portion of the yoke 210 to elastically support linear vibration of the vibrator part.

In addition, the elastic member 240 coupled to the vibrator part has maximum displacement at a resonance point at the time of application of power frequency.

Further, the elastic member 240 may include a magnetic fluid 241 coupled to a surface thereof facing the upper case 140.

Therefore, the elastic member 240 may serve as a damper preventing abrasion and vibration noise caused by contact between the vibrator part and the upper case 140 when the vibrator part linearly vibrates excessively.

Figure 4:
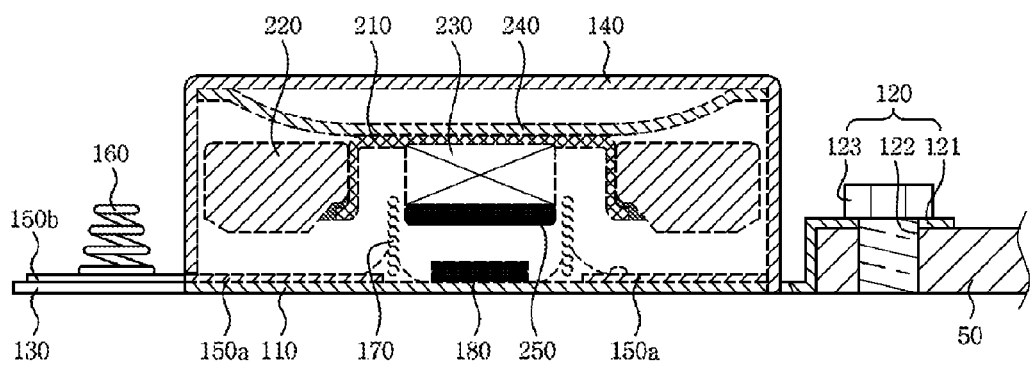
FIG. 4 is a side view showing a coupling relationship between a linear vibration motor shown in FIG. 2 and a set component.
Figure 5:
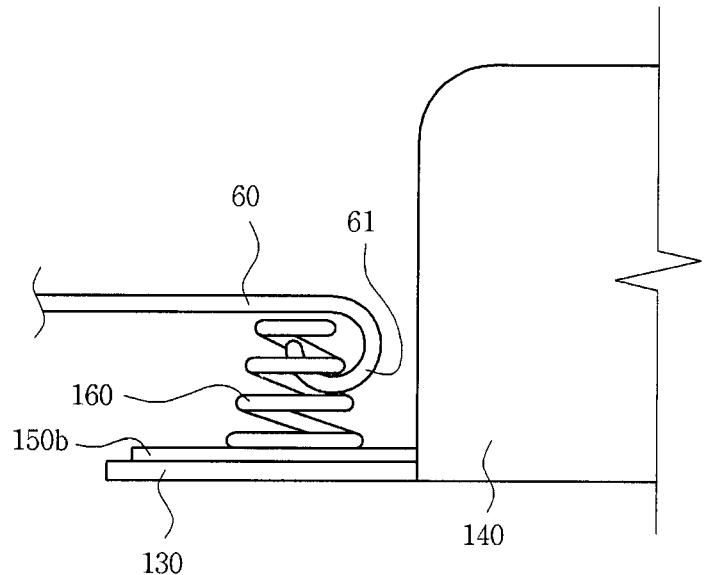
FIG. 5 is a schematic side view showing a coupling relationship between a linear vibration motor shown in FIG. 2 and a FPCB.

FIG. 4 is a view showing a coupling relationship between a linear vibration motor shown in FIG. 2 and a set component; and FIG. 5 is a schematic view showing a coupling relationship between a linear vibration motor shown in FIG. 2 and a FPCB.

As shown in FIG. 4, the set fixing strip 121 is positioned on an upper portion of a set component 50 to thereby surface-contact the set component 50.

In addition, the set component 50 is provided with a hole (not shown) having the same diameter as that of the set fixing hole 122 formed in the set fixing strip 121, wherein the hole may have a thread formed on an inner peripheral surface thereof.

Therefore, the fixing member 123 having the bolt shape is fixedly coupled to the set component 50 along the threads formed in the set fixing hole 122 and the hole of the set component 50.

Therefore, separation of the linear vibration motor from the set component 50 at the time of driving of the linear vibration motor may be prevented.

In addition, since the fixing member 123 is made of a metal material, the set fixing part 120 additionally serves as a ground (GND).

Therefore, a short-circuit is prevented, thereby making it possible to secure stability of the linear vibration motor.

As shown in FIG. 5, the contact part 160 is made of an electrically conductive material and has a spring shape.

More specifically, the contact part 160 may be coupled to the upper portion 150*b* of the printed circuit board coupled to the extended plate 130 side and be protruded in a vertical direction.

Therefore, according to the preferred embodiment of the present invention, the contact part 160 has the spring shape having elastic force and protruded in the vertical direction.

Further, the contact part 160 having the spring shape may be made of an electrically conductive material in order to be electrically connected to the FPCB 60, which is one of external set components, to thereby apply external power to the coil 170.

In addition, as shown, a distal end 61 of the FPCB 60 has a ring shape.

Therefore, the FPCB 60 may be coupled to the contact part 160 having the spring shape in a hook coupling scheme to thereby be electrically connected thereto.

Therefore, a coupled state between the contact part 160 and the FPCB 60 may be easily confirmed with the naked eye.

In addition, although the above-mentioned preferred embodiment of the present invention describes a case in which the contact part 160 has the spring shape, the present invention is not limited thereto. The contact part 160 may also have any shape protruded from the extended plate 130 in the vertical direction.

Figure 6:
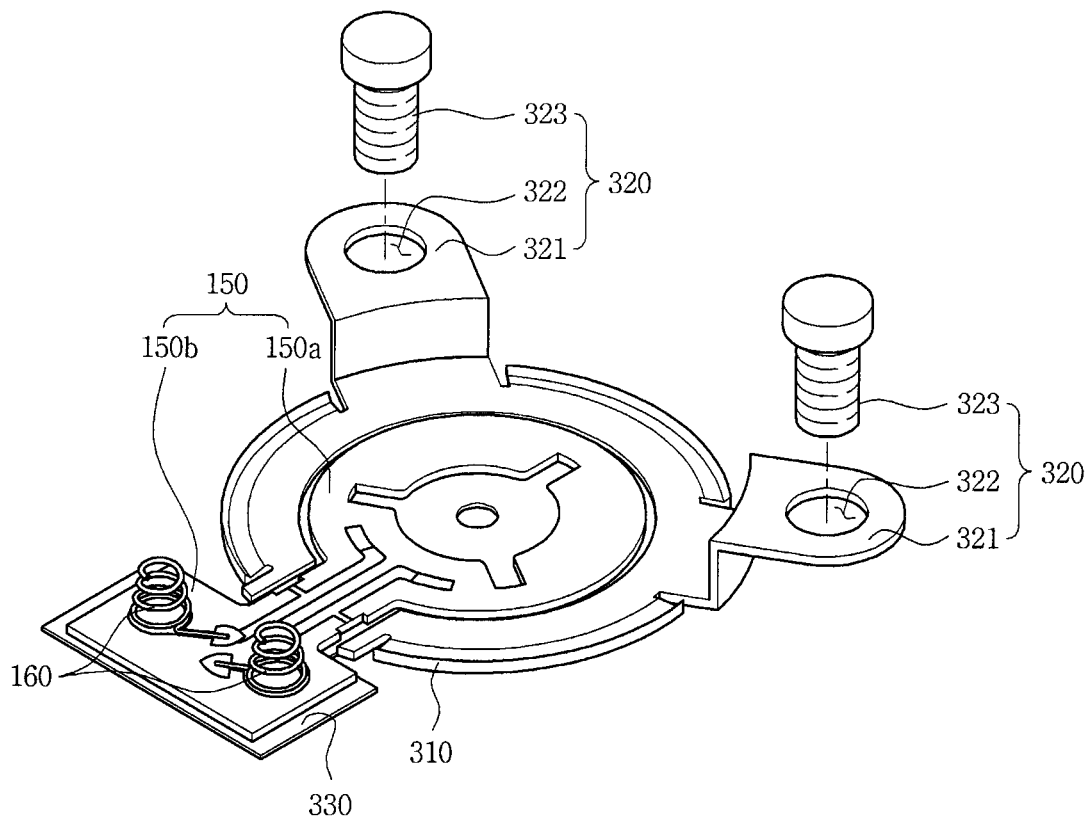
FIG. 6 is a perspective view of a cover member according to another preferred embodiment of the present invention.

FIG. 6 is a perspective view of a cover member according to another preferred embodiment of the present invention. As shown, the cover member 110 includes a plurality of set fixing parts 320.

More specifically, the set fixing part 320 may be formed singly or in plural along an outer peripheral surface of a cover member 310 so as not to be overlapped with an extended plate 330.

Further, as shown, in another preferred embodiment of the present invention, two set fixing parts 320 are formed in the cover member 310. However, the number of set fixing parts is not limited.

Therefore, the cover member 310 includes the plurality of set fixing parts 320, such a coupling force between the linear vibration motor and the set component is further increased.

Figure 7:
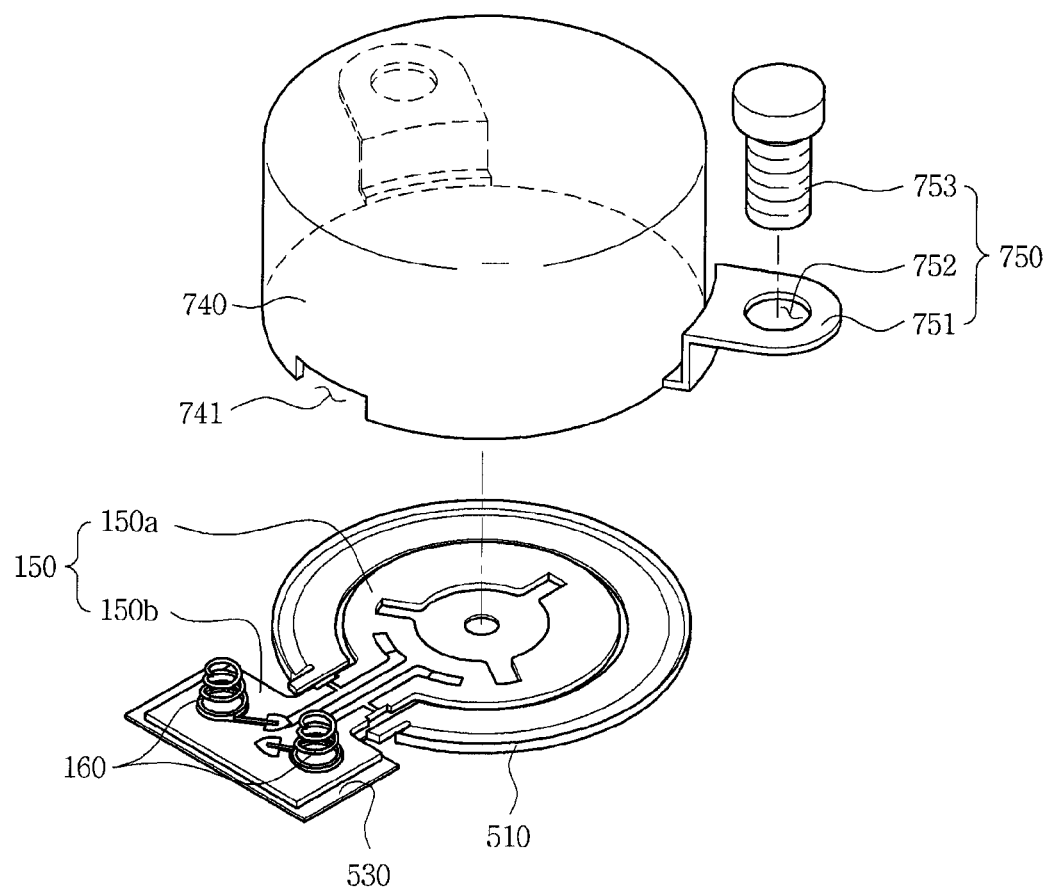
FIG. 7 is a schematic exploded perspective view of a stator part according to another preferred embodiment of the present invention.

FIG. 7 is a schematic exploded perspective view of a stator part according to another preferred embodiment of the present invention. As shown, an upper case includes a second set fixing part.

More specifically, a second set fixing part 720 includes a second set fixing strip 751 extended from one side of the upper case 740, a second set fixing hole 752 formed in the second set fixing strip 751, and a fixing member 753 penetrating through the second set fixing hole 752.

In addition, the second set fixing part 750 may be formed so as not to be overlapped with an extended plate 530 extended from a cover member 510.

In addition, the second set fixing part 750 may be formed singly or in plural.

Further, as shown, in another preferred embodiment of the present invention, two second set fixing parts 750 are formed in the upper case 740. However, the number of second set fixing parts is not limited.

Figure 8:
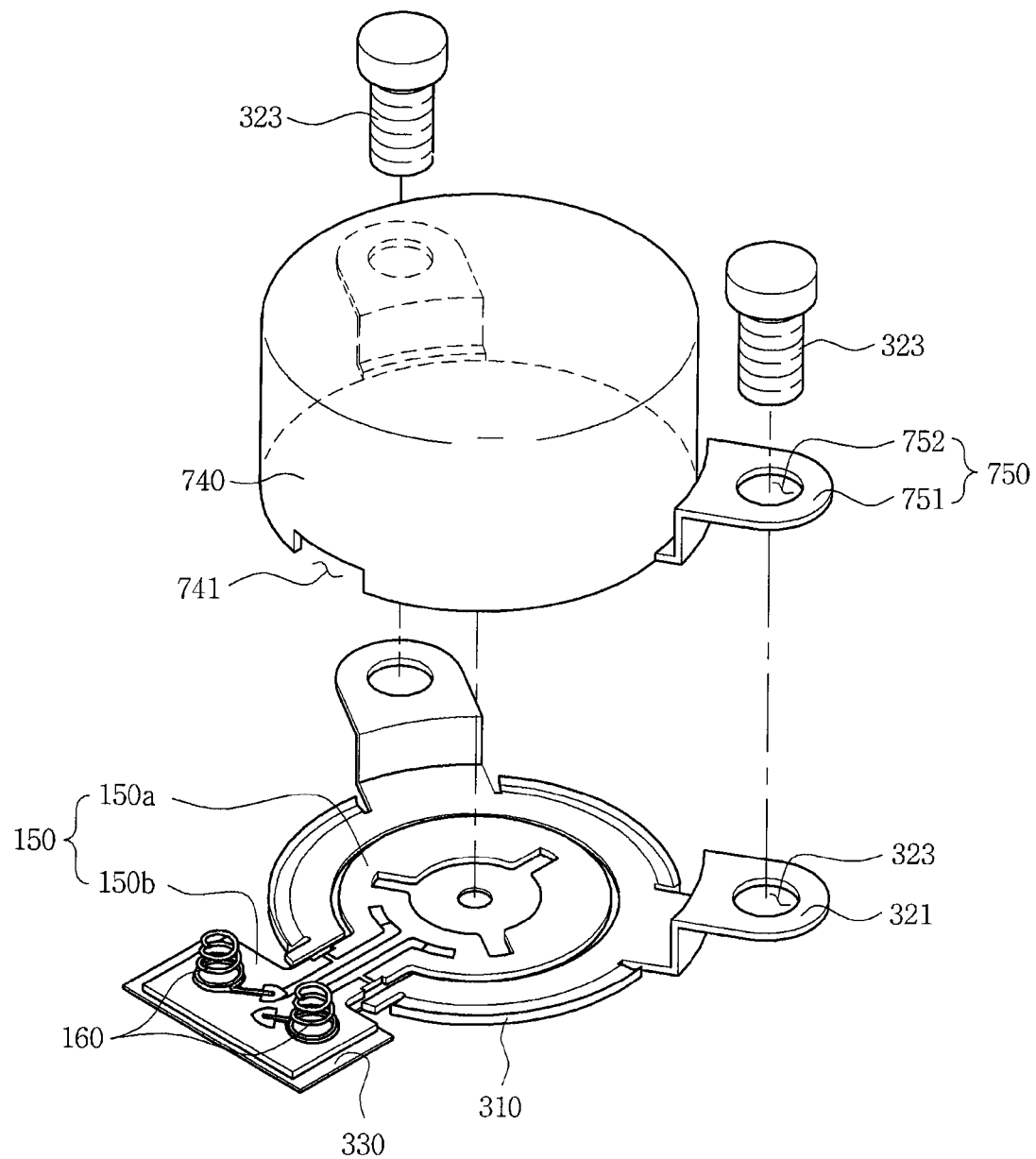
FIG. 8 is a schematic exploded perspective view of a stator part according to another preferred embodiment of the present invention.

FIG. 8 is a schematic exploded perspective view of a stator part according to another preferred embodiment of the present invention. As shown, each of an upper case 740 and a cover member 310 configuring a fixing part includes a set fixing part 320 and a second set fixing part 750 that are coupled to set components (not shown) and are formed singly or in plural.

More specifically, the cover member 310 includes one or two or more set fixing part 320 including a set fixing strip 321, a set fixing hole 323, and a fixing member 323.

In addition, the upper case 750 includes one or two or more second set fixing part 750 including a second set fixing strip 751 and a second set fixing hole 752.

In addition, any one pair of the set fixing part 320 and the second set fixing part 750 that may be formed in plural is formed to face each other, such that the set component (not shown), the cover member 310, and the upper case 740 may be coupled together using the fixing member 323 having the bolt shape.

As set forth above, according to the preferred embodiments of the present invention, the set fixing part coupled to the external set component is provided, thereby making it possible to prevent the linear vibration motor from being separated from the set component at the time of driving of the linear vibration motor.

In addition, a portion of the set fixing part is made of a metal material, such that the set fixing part additionally serves as a ground (GND), thereby making it possible to secure stability of the motor against the short-circuit.

Further, the contact part electrically connected to the FPCB, which is one of the external set components, is provided, thereby making it possible to easily manufacture the motor and confirm a coupled state between the linear vibration motor and the FPCB with the naked eye.

Furthermore, the coupled state between the linear vibration motor and the set component may be intuitively confirmed with the naked eye, thereby making it possible to improve yield of a product.

Although the preferred embodiments of the present invention have been disclosed for illustrative purposes, they are for specifically explaining the present invention and thus a linear vibration motor according to the present invention are not limited thereto, but those skilled in the art will appreciate that various modifications, additions and substitutions are possible, without departing from the scope and spirit of the invention as disclosed in the accompanying claims.

Accordingly, such modifications, additions and substitutions should also be understood to fall within the scope of the present invention.

What is claimed is:

1. A linear vibration motor comprising:
    a stator part including a coil having a power applied from the outside thereto to form a magnetic field;
    a vibrator part including a magnet facing the coil; and
    an elastic member having one end coupled to the stator part and the other end coupled to the vibrator part to elastically support linear vibration of the vibrator part,
    wherein the stator part includes:
        a cover member including a set fixing part extended to one side thereof to thereby be fixedly coupled to a set component and an extended plate extended to the other side thereof;
        an upper case coupled to an upper portion of the cover member so as to receive the vibrator part therein;
        a printed circuit board having the coil coupled thereto and coupled to the cover member and an upper portion of the extended plate; and
        a contact part made of an electrically conductive material in order to apply an external power to the coil and fixedly coupled to an upper portion of the printed circuit board of which a portion is coupled to the extended plate,
    wherein the set fixing part includes:
        a set fixing strip extended from one side of the cover member to thereby surface-contact the set component and including a set fixing hole formed therein, the set fixing hole including a thread formed in an inner peripheral surface thereof; and
        a fixing member fixedly coupling the set fixing strip and the set component to each other while penetrating through the set fixing hole,
        wherein the fixing member is made of a metal material in order for the set fixing part to serve as a ground (GND).

2. The linear vibration motor as set forth in claim 1, wherein the set fixing part is formed singly or in plural along an outer peripheral surface of the cover member so as not to be overlapped with the extended plate extended from the other side of the cover member.

3. The linear vibration motor as set forth in claim 1, wherein the contact part has a spring shape, and the set component electrically connected to the contact part, wherein the set component is a flexible printed circuit board (FPCB).

4. The linear vibration motor as set forth in claim 3, wherein a distal end of the FPCB is formed in a ring shape, hook coupled and electrically connected to the contact part.

5. The linear vibration motor as set forth in claim 1, wherein the stator part further includes a damper coupled to an upper surface of the cover member and faces the vibrator part.

6. The linear vibration motor as set forth in claim 1, wherein the vibrator part further includes:
    a yoke including a coupling part having the magnet coupled to an inner portion thereof; and
    a mass body coupled to an outer side of the yoke, and
    wherein the elastic member includes an upper end portion connected to the upper case and a lower end portion connected to an upper portion of the yoke to thereby elastically support the linear vibration of the vibrator part.

7. The linear vibration motor as set forth in claim 6, wherein the vibrator part further includes:
    a plate yoke coupled to a lower surface of the magnet;
    a magnetic fluid coupled to an outer peripheral surface of the magnet; and
    a damper coupled to a surface of the elastic member facing the upper case.

8. The linear vibration motor as set forth in claim 1, wherein the upper case further includes a second set fixing part extended to one side thereof to thereby be fixedly coupled to the set component.

9. The linear vibration motor as set forth in claim 8, wherein the second set fixing part includes:

a second set fixing strip extended from one side of the upper case to thereby surface-contact the set component and including a set fixing hole formed therein, the set fixing hole including a thread formed in an inner peripheral surface thereof; and the fixing member made of a metal material and fixedly coupling the second set fixing strip and the set component to each other while penetrating through a second set fixing hole.

10. The linear vibration motor as set forth in claim 8, wherein the second set fixing part is formed singly or in plural along an outer peripheral surface of the upper case so as not to be overlapped with the extended plate extended from the other side of the cover member.

11. The linear vibration motor as set forth in claim 10, wherein one of the second set fixing part formed in plural is extended from the outer peripheral surface of the upper case so as to face the set fixing part extended from the cover member in one side thereof.

12. A linear vibration motor comprising:
a stator part including a coil having a power applied from the outside thereto to form a magnetic field;
a vibrator part including a magnet facing the coil; and
an elastic member having one end coupled to the stator part and the other end coupled to the vibrator part to elastically support linear vibration of the vibrator part,
wherein the stator part includes:
a cover member including an extended plate extended to one side thereof;
an upper case including a set fixing part extended to one side thereof to thereby be fixedly coupled to a set component and coupled to an upper portion of the cover member so as to receive the vibrator part therein;
a printed circuit board having the coil coupled thereto and coupled to the cover member and an upper portion of the extended plate; and
a contact part made of an electrically conductive material in order to apply an external power to the coil and fixedly coupled to an upper portion of the printed circuit board of which a portion is coupled to the extended plate,
wherein the set fixing part includes:
a set fixing strip extended from one side of the cover member to thereby surface-contact the set component and including a set fixing hole formed therein, the set fixing hole including a thread formed in an inner peripheral surface thereof; and
a fixing member fixedly coupling the set fixing strip and the set component to each other while penetrating through the set fixing hole,
wherein the fixing member is made of a metal material in order for the set fixing part to serve as a ground (GND).

13. The linear vibration motor as set forth in claim 12, wherein the set fixing part is formed singly or in plural along an outer peripheral surface of the upper case so as not to be overlapped with the extended plate extended from one side of the cover member.

14. The linear vibration motor as set forth in claim 12, wherein the contact part has a spring shape, and the set component electrically connected to the contact part, wherein the set component is a FPCB.

15. The linear vibration motor as set forth in claim 14, wherein a distal end of the FPCB is formed in a ring shape, hook coupled and electrically connected to the contact part.

\* \* \* \* \*